Aug. 25, 1970    K. C. ALLISON    3,525,826

MULTI-SECTION ROTARY SWITCH

Filed May 5, 1969    2 Sheets-Sheet 1

Inventor
Kenneth C. Allison

By *Stanley Hooks*
Attorney

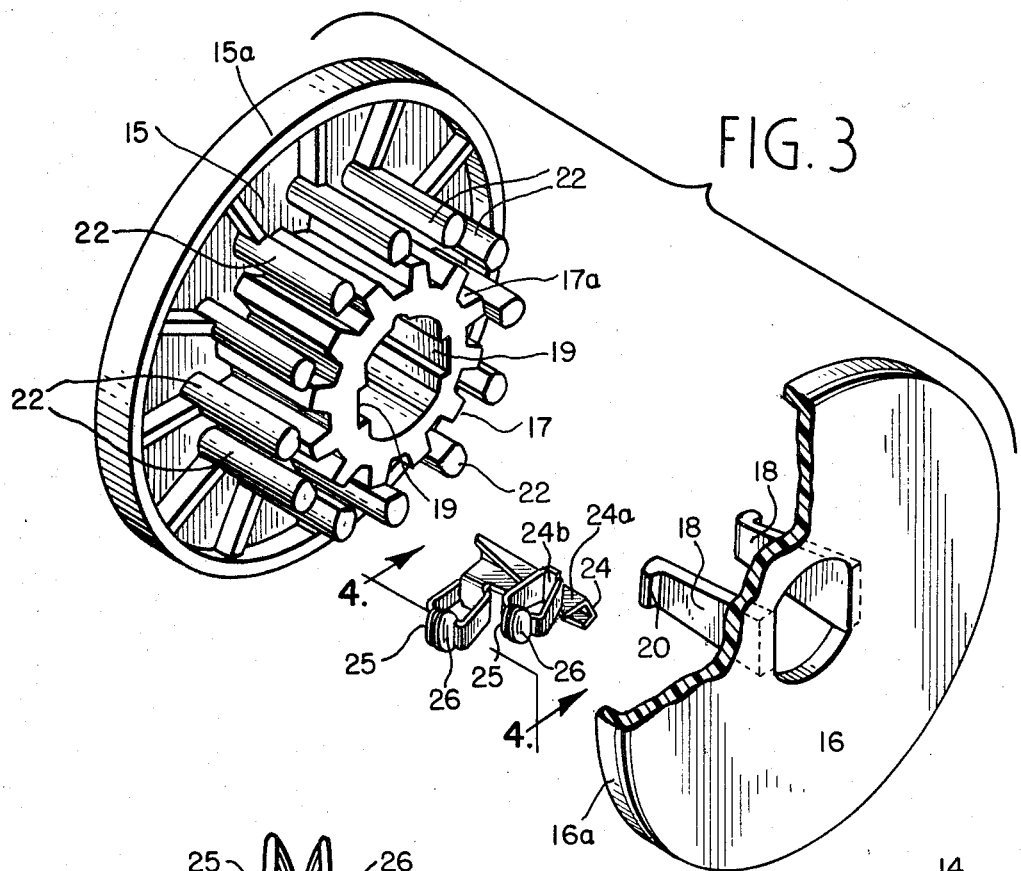
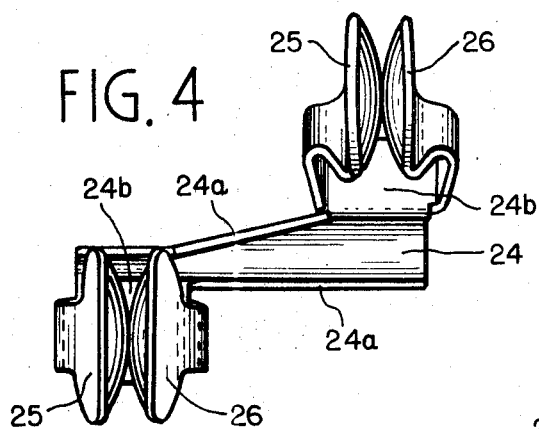
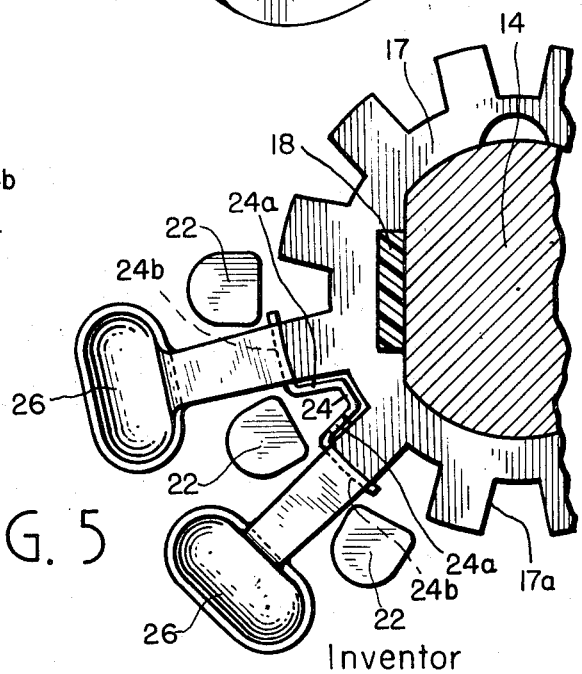

United States Patent Office 3,525,826
Patented Aug. 25, 1970

3,525,826
MULTI-SECTION ROTARY SWITCH
Kenneth C. Allison, Crystal Lake, Ill., assignor to Kollsman Instrument Corporation, Elmhurst, N.Y., a corporation of New York
Filed May 5, 1969, Ser. No. 821,824
Int. Cl. H01h 19/58
U.S. Cl. 200—11                                             11 Claims

ABSTRACT OF THE DISCLOSURE

A multi-section rotary switch having a stator unit of insulating material with an opening intersecting opposite faces of the stator unit into which a first series of coplanar stator contacts project in a first plane intermediate said faces of the stator unit and spaced apart circumferentially of said opening and into which a second series of coplanar stator contacts project in a second plane intermediate said faces of the stator unit in spaced parallel relation to said first plane and spaced apart circumferentially of said opening, and a rotor unit having a hub portion with which a shaft has driving connection to establish rotation of said rotor unit about an axis centrally of said opening in the stator unit and perpendicular to the planes common to said stator contacts, said rotor unit being divided axially in radially extending relation to said hub portion to provide a space for occupancy by said first and second series of stator contacts and for occupancy by a rotor contact operable to electrically connect the stator contacts of said first series with the stator contacts of said second series according to the rotated position of said rotor unit, said rotor unit having an axial dimension conforming to the axial dimension of the stator unit.

---

This invention relates to an electrical switch of the rotary type and more particularly a switch of this character wherein circuits are established through stator contacts occupying spaced apart parallel planes within the confines of an opening provided in a stator unit via rotor contacts mounted on a rotor unit which is confined within and operable to rotate about an axis centrally of said stator unit opening and perpendicular to planes occupied by said stator contacts.

It is an object of this invention to provide a rotary switch wherein the rotor unit and the rotor contacts mounted thereon incorporate novel features of design and assembly which not only simplify the production of the switch with resulting cost savings and improved quality but also enhances the versatility of the switch in meeting the demands of an ever widening diversity of switch circuitry patterns.

In a rotary switch embodying the present invention electrical connection is established between first and second stator contacts occupying axially spaced apart parallel planes perpendicular to the axis of rotation of a rotor unit by means of a rotor contact member having a first pair of axially opposed jaws engageable with said first stator contact and a second pair of axially opposed jaws offset from said first pair of axially opposed jaws circumferentially of the path of rotation of the rotor unit and engageable with said second stator contact, said contact jaws being defined by integral radially extending branches of a conductor strip spanning the distance between said planes common to said first and second stator contacts.

The foregoing and other objects of the present invention will be understood more clearly from the following detailed description taken in connection with the accompanying drawing, wherein:

FIG. 3 is an exploded view of the components of the rotor unit including the rotor contact member embodying the features of this invention.

FIG. 4 is an enlarged detail view of the rotor contact member.

FIG. 5 is a fragmentary detail view showing the rotor contact member and the rotor unit in operative assembly while removed from the stator unit.

Figure 1:
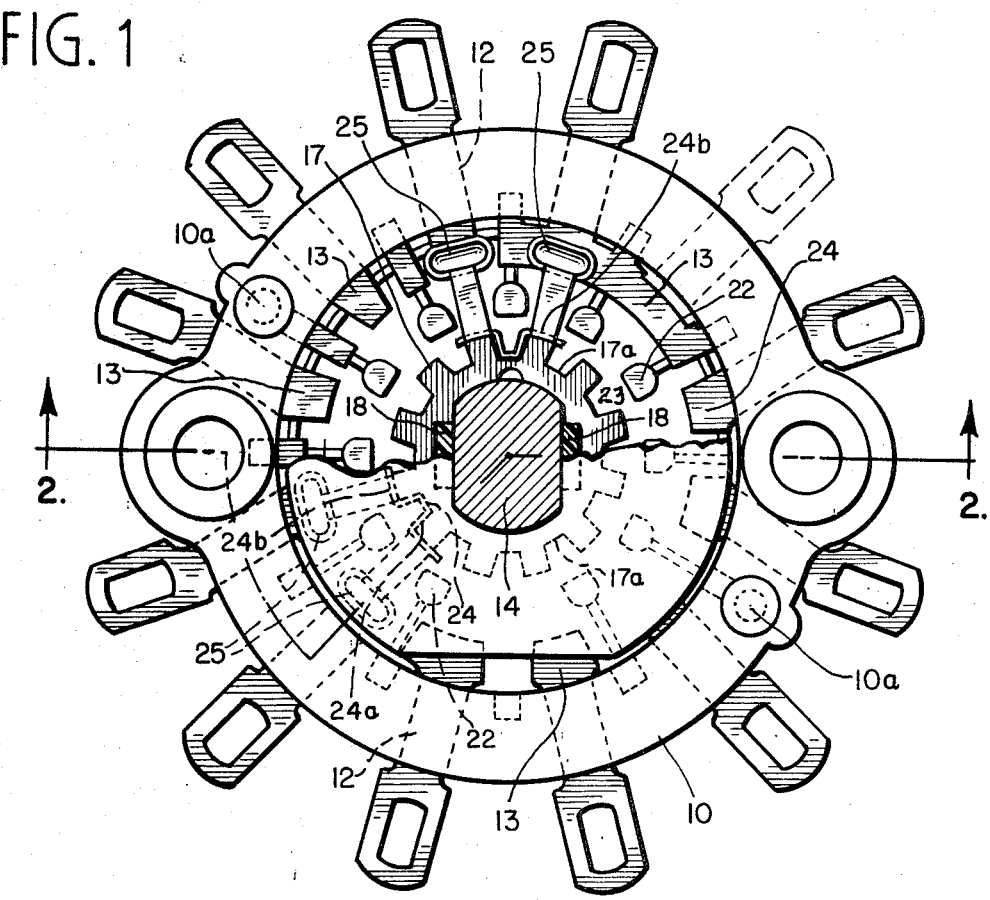
FIG. 1 is a plan view of a rotary switch embodying the features of the present invention.

A multi-section rotary switch embodying the features of this invention is adaptable for use in a great variety of applications wherein a plurality of circuits are to be established. The switch shown in the drawing and described hereinafter shows only one of the many contact arrangements available in a switch incorporating a rotor contact member in accordance with this invention.

In the particular embodiment shown herein, the stator unit is defined by a pair of like stators 10 of molded insulating material, each having a rotor receiving opening 11 intersecting the opposite faces thereof, and secured in stacked axially aligned relation by suitable fastening means such for example, as pins 10a of non-conductive material which register with aligned openings in the stators 10 with exposed ends which are subjected to heat and pressure to form anchoring heads at the exposed face portions of the stators 10 bordering said aligned openings containing said pins. Each stator 10 provides an insulating support in which conductor strips 12 are embedded. Exposed end portions 13 of said strips provide coplanar stator contacts in circumferentially spaced apart relation within the confines of the rotor opening 11 of the stator 10 associated therewith. Accordingly, as viewed in FIG. 2, the stators 10 combined to form a stator unit having a first series of stator contacts 13 in a first plane intermediate the exposed faces of the stators 10 and a second series of stator contacts 13 in a second plane intermediate said exposed faces of the stators 10 in a second plane in spaced apart parallel relation to said first plane.

Figure 2:
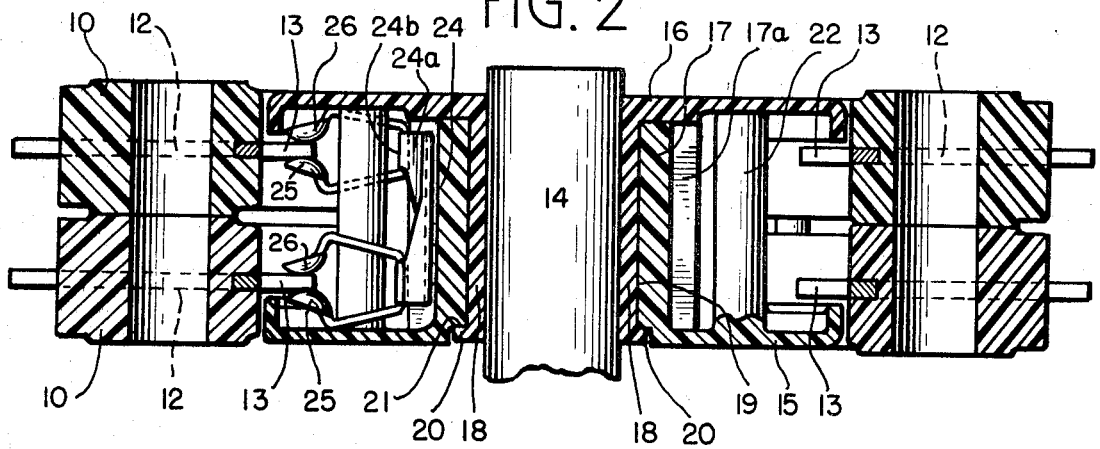
FIG. 2 is a sectional view taken along line 2—2 of FIG. 1.

A rotor unit operable by means of a drive shaft 14 to rotate said rotor unit within the confines of the opening 11 in the stator unit about an axis perpendicular to the planes containing said first and second series of stator contacts 1 includes a first rotor section 15 and a second rotor section 16. Each section is formed of suitable insulating material. As shown in FIGS. 2 and 3 of the drawing, rotor section 15 is provided with a hub portion 17 in axially extending relation to the area of section 15 in radially outlying relation to said hub portion.

Means for joining rotor section 16 to the hub portion 17 of rotor section 15 so as to establish a rigid axially aligned assembly of said sections includes a pair of coupling fingers 18 defined by axial extensions of the rotor section 16 along opposite edge portions of the opening in which the shaft 14 has driving fit with the rotor section 16. Pockets 19 are formed in opposite wall portions of the opening in which the shaft 14 has driving fit with the hub 17 of rotor section 15 so as to establish axial aligment with the fingers 18 of rotor section 16. The coupling fingers 18 thus have axially slidable interfitting reception in the pockets 19 whereby the rotor sections 15 and 16 are secured in selected relatively rotated interlocked assembly. Each finger 18 has a terminal end portion offset radially outwardly to define a tab 20 which has snap-in engagement with a shoulder 21 bordering the pocket 19 facing the tab 20 so as to fix the rotor sections against unintentional withdrawal from an axially joined operative assembly. Each shoulder 21 is offset axially inwardly of the axial limits of the rotor section 15 facing away from the rotor section 16 so as to maintain the tab 20 associated therewith inside the axial limits of the rotor sections 15.

As shown in FIG. 2, while the rotor sections 15 and 16 are thus joined by the coupling fingers 18, the combined axial dimension of said rotor sections is so limited as to conform to the axial dimension of the stator at the surface thereof surrounding the rotor opening 11. It should also be observed that the surface of the shaft 14 and the surfaces of the coupling fingers facing the shaft have such interengagement as to maintain the tabs 20 in a spread apart condition effective to prevent withdrawal of the tabs from interlocked engagement with the shoulder 21 associated therewith. The areas of the rotor sections extending radially away from the hub portion 17 are spaced apart axially of the hub 17 to form an annular slot through which the stator contacts 13 have access to the area between the assembled rotor sections 15 and 16.

As shown in FIGS. 3 and 5, indentations provided in the surface of the hub portion facing the area occupied by the stator contacts 13 define axially extending recesses 17ª in uniformly spaced apart relation circumferentially of the hub portion 17. Reference numeral 22 designates axially extending columns formed integrally with the rotor section 15 between the area occupied by the stator contacts 13 and hub portion 17. Each column substantially spans the distance between the rotor sections 15 and 16 and is in radially aligned relation to a recess 17ª in the hub portion. The surface of the hub portion 17 of rotor section 15 between the recesses 17ª and the surface of the columns facing the hub portion thus cooperate to form an annular clearway 23 skirting the hub portion 17 while the space between each neighboring pair of columns 22 provides a radial clearway joining said annular clearway with the area occupied by the stator contacts 13.

A rotor contact member for establisihng electircal connection between a pair of contacts 13 occupying axially spaced apart planes within the rotor opening 11 is shown in FIG. 2 as including a conductor strip 24 which is confined within and extends axially of a recess 17ª of the rotor hub of rotor section 15. Referring more particularly to FIGS. 3 and 4, it will be further noted that the strip 24 is bent upon itself along an axially extending fold line to form first and second like wings 24ª which diverge uniformly radially outwardly from said fold line for interengagement with the surfaces of the recess 17ª facing said wings 24ª and the fold line joining said wings. Each wing includes an integral branch extending circumferentially away from the area between said wings with the branch of the first wing 24ª positioned diagonally opposite the branch of the second wing 24ª relative to a rectangular area bordered along a pair of opposite sides thereof parallel to and equidistantly straddling said fold line. Each branch thus extending from the wings of said conductor strip provides a pair of like fingers and an intervening web 24ᵇ to which said fingers are joined to define a pair of axially opposed contact jaws 25 and 26. The branches of the wings of the conductor strip which define said pairs of axially opposed contact jaws 25 and 26 accordingly flank the column 22 radially opposite the recess 17ª of the rotor hub containing the conductor strip. The columns 22 which are directly opposite the recesses 17ª that flank the recess 17ª containing the conductor strip 24 provide surfaces engageable with radially extending edges of the contact jaws facing away from the column 22 flanked by said contact jaws to establish the confines of the area occupied by the contact jaws which in conjuntion with the interfitting relationship between the wings 24ª of the conductor strip 24 and recess 17ª in which said wings 24ª are nested provide an interconnection between the rotor section 15 and the rotor contact member which effects movement of the contact jaws 25 and 26 of the rotor contact member along paths defined by the stator contacts 13 sequentially engaged by said contact jaws in response to rotation of the rotor sections 15 and 16 under control of the operating shaft 14. It is to be noted, however, that such interconnection between the rotor contact member and the rotor section 15 also allows the rotor contact member a degree of freedom to tilt relative to the rotor hub about axes extending radially of the rotor hub and thereby accommodate relative adjustment of the jaws 25 and 26 of the contact member in relation to the stator contacts when such adjustment is needed to compensate for slight variations in axial spacing between the rows of stator contacts. The webs 24ᵇ terminate in circumferentially outwardly extending ears and the columns 22 opposite the recesses which flank the recess 17ª occupied by the wings 24ª of the strip 24 have surfaces facing the hub 17 with which said ears have engagement to restrict movement of the rotor contact member radially outwardly of the area operatively occupied by the strip 24 wherein said wings 24ª of the rotor contact member have interengagement with the recess 17ª associated therewith.

A rim 15ª along the edge of the rotor section 15 facing the wall of the opening in the stator 10 and a similar rim 16ª along the corresponding edge of the rotor section 16 have engagement with the area of the stator contacts 13 between said wall of the opening 11 and that portion of the stator contacts 13 within the line of travel of the rotor contact jaws 25 and 26 to restrict axial movement of the rotor sections 15 and 16 relative to the stators 10.

What is claimed is:

1. A rotary switch having a stator unit of insulating material with an opening intersecting opposite faces of the stator unit into which a first series of coplanar stator contacts project in a first plane intermediate said faces of the stator unit and spaced apart circumferentially of said opening and into which a second series of coplanar stator contacts project in a second plane intermediate said faces of the stator unit and spaced apart circumferentially of said opening, a rotor unit having a hub portion with which a shaft has driving connection to establish rotation of said rotor unit about an axis centrally of said stator unit opening and perpendicular to the planes common to said stator contacts, said rotor unit being divided axially in radially extending relation to said hub portion to provide a space for occupancy by said first and second series of stator contacts and for occupancy by a rotor contact member, said rotor contact member having a first pair of axially opposed jaws engageable with contacts in said first series of stator contacts and a second pair of axially opposed jaws engageable with contacts in said second series of stator contacts, said contact jaws being defined by integral radially extending branches of a conductor strip spanning the distance between said planes common to said stator contacts.

2. A rotary switch according to claim 1 wherein said second pair of axially opposed jaws of the rotor contact member are offset from said first pair of axially opposed jaws circumferentially of the path of rotation of the rotor unit.

3. A rotary switch according to claim 1 wherein said rotor unit has an axial dimension conforming to the axial dimension of the stator unit.

4. A rotary switch according to claim 1 wherein the conductor strip is folded upon itself along an axially extending fold line to form first and second like wings which diverge uniformly radially outwardly from said fold line, and said branches of the conductor strip defining said rotor contact jaws occupy positions in circumferentially extending relation away from the area between said wings.

5. A rotary switch according to claim 4 wherein said branches of the conductor strip defining said rotor contact jaws occupy positions spaced apart diagonally of a rectangular area borderd by a pair of opposed sides parallel to and equidistantly straddling said fold line.

6. A rotary switch according to claim 1 wherein the rotor hub is provided with an axially extending recess which is occupied by the conductor strip of the rotor contact member and an axially extending column in radial alignment with said recess and formed integrally with said rotor unit is flanked by the branches of the conductor strip which define the first and second pairs of said axially opposed contact jaws.

7. A rotary switch according to claim 1 wherein indentations provided in the surface of the hub portion facing the area occupied by the stator contacts define axially extending recesses in uniformly spaced apart relation circumferentially of the hub portion and axial extensions formed integrally with the rotor unit between the area occupied by the stator contacts and the hub portion occupy positions in radial alignment with said recesses in the hub portion, and wherein the conductor strip of the rotor contact member is folded upon itself along an axially extending fold line to form first and second like wings which diverge uniformly radially outwardly from said fold line and have nested axially extending interengagement with a selected rotor hub recess, and said branches of the conductor strip defining said rotor contact jaws occupy positions flanking the column defined by the axial extension of the rotor unit radially opposite the rotor hub recess containing said conductor strip.

8. A rotary switch according to claim 7 wherein the interengagement of the wings of the conductor strip with the surfaces of the rotor hub recess containing said strip allows a degree of freedom to provide for tilting of the conductor strip relative to the rotor hub about axes extending radially of the rotor hub to accommodate adjustment of the axially opposed jaws of the rotor contact member in relation to the stator contacts when such adjustment is needed.

9. A rotary switch according to claim 1 wherein said stator unit is defined by first and second like stator members secured in axially stacked relation, and said first series of stator contacts is mounted in the first stator member and the second series of stator contacts is mounted in the second stator member.

10. A rotary switch according to claim 1 wherein said rotor unit is defined by a first rotor section having an axially extending hub portion and a second rotor section joined to the hub portion of said first rotor section by self contained interlocked fastening means.

11. A rotary switch according to claim 10 wherein said fastening means include coupling fingers defined by axial extensions of said second rotor section along opposite edge portions of the shaft receiving opening in said second rotor section, pockets formed in opposite wall portions of the shaft receiving opening in the hub portion of said first rotor section with which said coupling fingers are axially aligned for reception in said pockets, each of said fingers terminating in a tab having overlapping engagement with surfaces of the first rotor section bordering said pockets and facing away from the second rotor section to prevent axial separation of said first and second rotor sections, and each of said fingers having engagement with a shaft in said shaft receiving openings in said rotor sections to prevent radial withdrawal of said fingers from said pockets.

References Cited

UNITED STATES PATENTS

| 3,171,906 | 3/1965 | Allison. |
| 3,242,271 | 3/1966 | Stephan et al. |
| 3,316,363 | 4/1967 | Valdettaro et al. |

FOREIGN PATENTS 251,309    4/1964    Australia.

ROBERT K. SCHAEFER, Primary Examiner

J. R. SCOTT, Assistant Examiner

U.S. Cl. X.R.

200—166